(12) United States Patent
Yan

(10) Patent No.: US 7,937,800 B2
(45) Date of Patent: May 10, 2011

(54) ROBOTIC VACUUM CLEANER

(76) Inventor: Jason Yan, Hsien (TW)

( * ) Notice: Subject to any disclaimer, the term of this patent is extended or adjusted under 35 U.S.C. 154(b) by 1467 days.

(21) Appl. No.: 10/978,433

(22) Filed: Nov. 2, 2004

(65) Prior Publication Data

US 2005/0235451 A1    Oct. 27, 2005

(30) Foreign Application Priority Data

Apr. 21, 2004 (TW) ................................ 93111106 A
Jun. 16, 2004 (TW) ................................ 93117349 A

(51) Int. Cl.
*A47L 5/00* (2006.01)
(52) U.S. Cl. ............................. 15/319; 15/339; 15/340.1
(58) Field of Classification Search .................... 15/319, 15/339, 340.1
See application file for complete search history.

(56) References Cited

U.S. PATENT DOCUMENTS

| | | | |
|---|---|---|---|
| 6,594,844 B2 * | 7/2003 | Jones | 15/49.1 |
| 6,841,963 B2 * | 1/2005 | Song et al. | 318/568.12 |
| 6,883,201 B2 * | 4/2005 | Jones et al. | 15/319 |
| 7,188,000 B2 * | 3/2007 | Chiappetta et al. | 700/245 |
| 7,429,843 B2 * | 9/2008 | Jones et al. | 318/568.12 |

* cited by examiner

*Primary Examiner* — Joseph J Hail, III
*Assistant Examiner* — Shantese McDonald
(74) *Attorney, Agent, or Firm* — Bacon & Thomas, PLLC

(57) ABSTRACT

A robotic vacuum cleaner includes a casing with a motor-driven wheel unit mounted on a lower major wall thereof, and a tactile sensor unit yieldable radially relative to the casing. An electrical control unit is operable to control the wheel unit to operate in a starting mode in which the casing is moved along a spiral path, and, upon receipt of a switching signal generated by the sensor unit in response to a contact of the sensor unit with an obstacle, controls the wheel unit to operate in an edge-cleaning mode in which the wheel unit is initially turned to a normal angle, is then driven to move forward a predetermined distance, is subsequently turned to an activating angle, and is moved towards the obstacle to permit contact of the sensor unit with the obstacle so as to result in generation of switch signal enabling the wheel unit to continue to operate in the edge-cleaning mode.

16 Claims, 5 Drawing Sheets

US 7,937,800 B2

ROBOTIC VACUUM CLEANER

CROSS-REFERENCE TO RELATED APPLICATION

This application claims priorities of Taiwanese Application No. 093111106, filed on Apr. 21, 2004, and Taiwanese Application No. 093117349, filed on Jun. 16, 2004.

BACKGROUND OF THE INVENTION

1. Field of the Invention

This invention relates to a robotic vacuum cleaner, more particularly to a robotic vacuum cleaner which can proceed with an edge-cleaning mode for improving the cleaning effect.

2. Description of the Related Art

Referring to FIG. 1, a conventional robotic vacuum cleaner 100 is shown to include a casing 11, a plurality of motor-driven wheels 111, a plurality of drive motors (not shown) disposed to drive the wheels 111 so as to move the casing 11 along a floor surface to be cleaned, an electrical control unit 13, and a sensing unit 15. A variety of path programs are stored in the electrical control unit 13 to control the drive motors so as to selectively steer the wheels 111 to cause backward or forward displacement, or rotation of the casing 11. The sensing unit 15 has left and right sensors 151 mounted on lateral front portions of the casing 11, and is electrically connected to the electrical control unit 13 such that once the casing 11 hits an obstacle 91, such as a wall, an article of furniture, and the like, the sensing unit 15 is activated to generate a switching signal to the electrical control unit 13 to enable the electrical control unit 13 to control the wheels 111 to move the casing 11 away from the obstacle 91 for an appropriate distance, and to rotated the casing 11 a random angle before proceeding along the original programmed path.

Although the robotic vacuum cleaner 100 is moved substantially over the entire floor surface to be cleaned, it cannot easily reach edges of the obstacle 91 like corners of the wall or edges of furniture. Therefore, a distance sensor 17 is mounted to a side of the casing 11 such that when the casing 11 is moved away from the obstacle 91 and is rotated, the distance sensor 17 detects a distance between the casing 11 and the obstacle 91. According to the distance detected by the distance sensor 17, the electrical control unit 13 controls the wheels 111 to move the casing 11 along the programmed path, which is spaced from the obstacle 91 by a fixed distance.

However, in operation, it may be necessary to adjust the sensitivity of the distance sensor 17 according to the condition of the environment to be cleaned. While higher sensitivity can achieve a better cleaning effect, it may increase chances of bumping of the casing 11 against the obstacle 91 to result in damage to the robotic vacuum cleaner 100. On the other hand, lower sensitivity results in a larger distance between the casing 11 and the obstacle 91 to thereby reduce the cleaning effect of the robotic vacuum cleaner 100.

SUMMARY OF THE INVENTION

The object of the present invention is to provide a robotic vacuum cleaner which can operate in an edge-cleaning mode to achieve a better cleaning effect.

According to this invention, the robotic vacuum cleaner includes a casing having a lower major wall confronting a floor surface. The lower major wall includes a central area defining a central axis normal thereto, and a surrounding peripheral area surrounding the central area. The surrounding peripheral area includes a leading region which is positioned ahead of the central area when the casing is driven to move along the floor surface, and left and right front regions which flank the leading region. A suction unit is disposed in the lower major wall to draw dust from the floor surface. A motor-driven wheel unit is disposed on the lower major wall and behind the leading region, and is steerable between a normal angle at which the leading region is movable forward straight ahead, and an activating angle at which one of the left and right front regions is movable towards an obstacle. A drive motor unit is disposed to drive the motor-driven wheel unit to move the casing along the floor surface. A tactile sensor unit is disposed outwardly of one of the left and right front regions, and is yieldable radially relative to the corresponding one of the left and right front regions so as to generate a switching signal in response to contact of the tactile sensor unit with the obstacle.

An electrical control unit is coupled to the tactile sensor unit and the drive motor unit. The control unit is operable to control the motor-driven wheel unit to operate in a starting mode in which the casing is moved along a spiral path, with the leading region heading forwards. Upon receipt of the switching signal from the tactile sensor unit, the control unit controls the motor-driven wheel unit to operate in an edge-cleaning mode in which the motor-driven wheel unit is initially turned to the normal angle, is then driven to move forward a predetermined distance along the floor surface, is subsequently returned to the activating angle, and is thereafter moved toward the obstacle to permit contact of the tactile sensor unit with the obstacle, thereby enabling the motor-driven wheel unit to continue to operate in the edge-cleaning mode.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
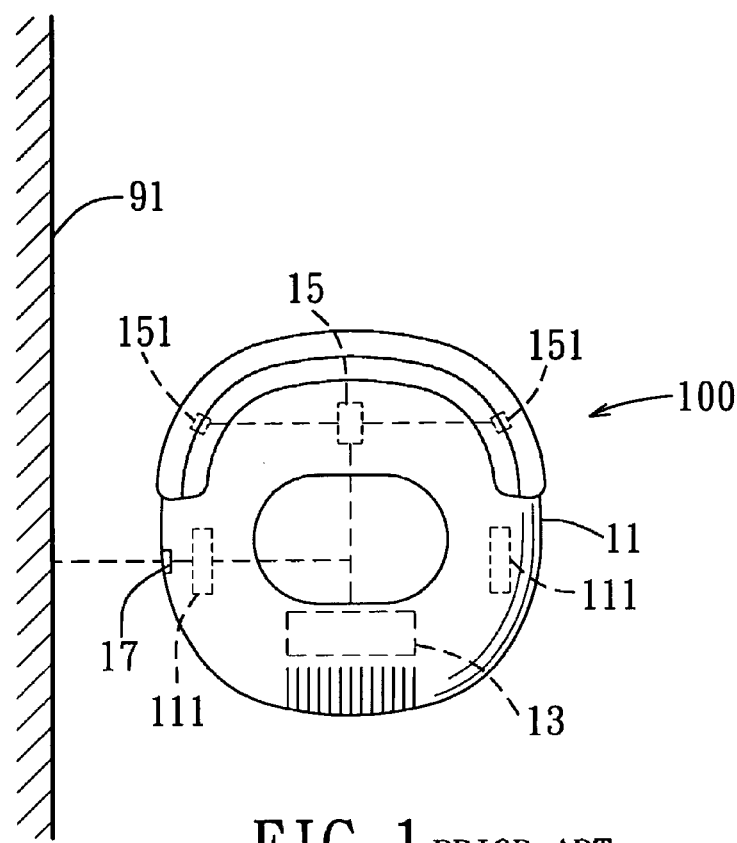
FIG. 1 is a schematic view of a conventional robotic vacuum cleaner.
Figure 2:
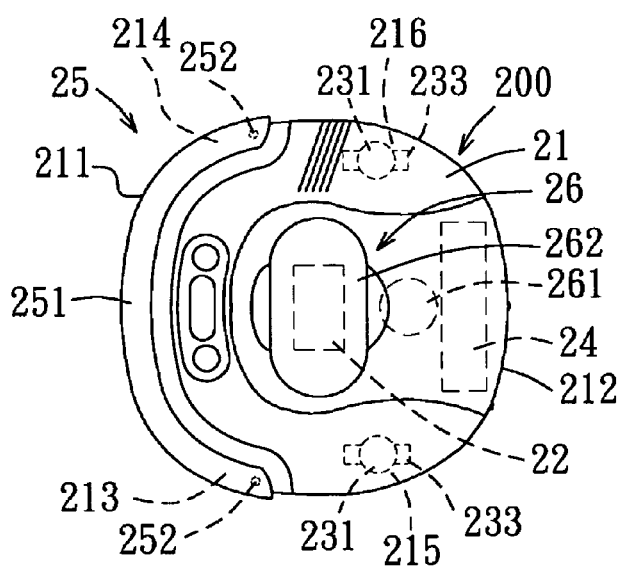
FIG. 2 is a schematic view of the preferred embodiment of a robotic vacuum cleaner according to this invention.

Referring to FIG. 2, the preferred embodiment of a robotic vacuum cleaner 200 according to the present invention is shown to comprise a casing 21, a suction unit 26, a motor-driven wheel unit, a drive motor unit, a tactile sensor unit 25, and an electrical control unit 22.

The casing 21 has a lower major wall 212 which is adapted to confront a floor surface to be cleaned, and which includes a central area that defines a central axis normal to the central major wall, and a surrounding peripheral area that surrounds the central area about the central axis. The surrounding peripheral area includes a leading region 211 which is positioned ahead of the central area when the casing 21 is driven to move along the floor surface, left and right front regions 213, 214 which flank the leading region 211, and left and right rear regions 215, 216 which are disposed rearwardly of the left and right front regions 213, 214, respectively.

The suction unit 26 is disposed in the lower major wall 212, and is driven by means of a power supply unit 24 to draw dust from the floor surface to be cleaned in a known manner. Briefly, the suction unit 26 includes a duct 262 which is disposed in the casing 21 and which has a vacuum inlet extending downwardly of the lower major wall 212, and an impeller 261 which is disposed in the casing 21 and downstream of the vacuum inlet so as to draw dust from the floor surface.

In this embodiment, the motor-driven wheel unit includes left and right wheels 233 which are mounted on the left and right rear regions 215, 216, respectively. The drive motor unit includes left and right drive motors 231 which are disposed to drive the left and right wheels 233, respectively, so as to steer the left and right wheels 233 to move the casing 21 along the floor surface in a certain motion to be described in greater detail hereinafter.

The tactile sensor unit 25 includes a shielding plate 251. The shielding plate 251, which when receives an applied force it is able to shift toward the casing 21 in the side where the shielding plate 251 receives the applied force and shifts back to its original position when not receives the applied force, is mounted to the casing 21 and outwardly covers the leading region 211 and left and right front regions 213, 214. Once the shielding plate 251 is brought to hit against an obstacle 92, such as a wall shown in FIG. 3, the shielding plate 251 shifts toward the left front region 213 or the right front region 214 of the casing 21 to depress the left or right sensor 252 according to which front region of the casing 21 is a depressed side. After the left or right sensor 252 is thus depressed by the shielding plate 251, the tactile sensor unit 25 generates a switching signal until releasing the shielding plate 251 from depressing the sensor 252 by allowing the shielding plate 251 to shift outward from the depressed side.

Figure 3:
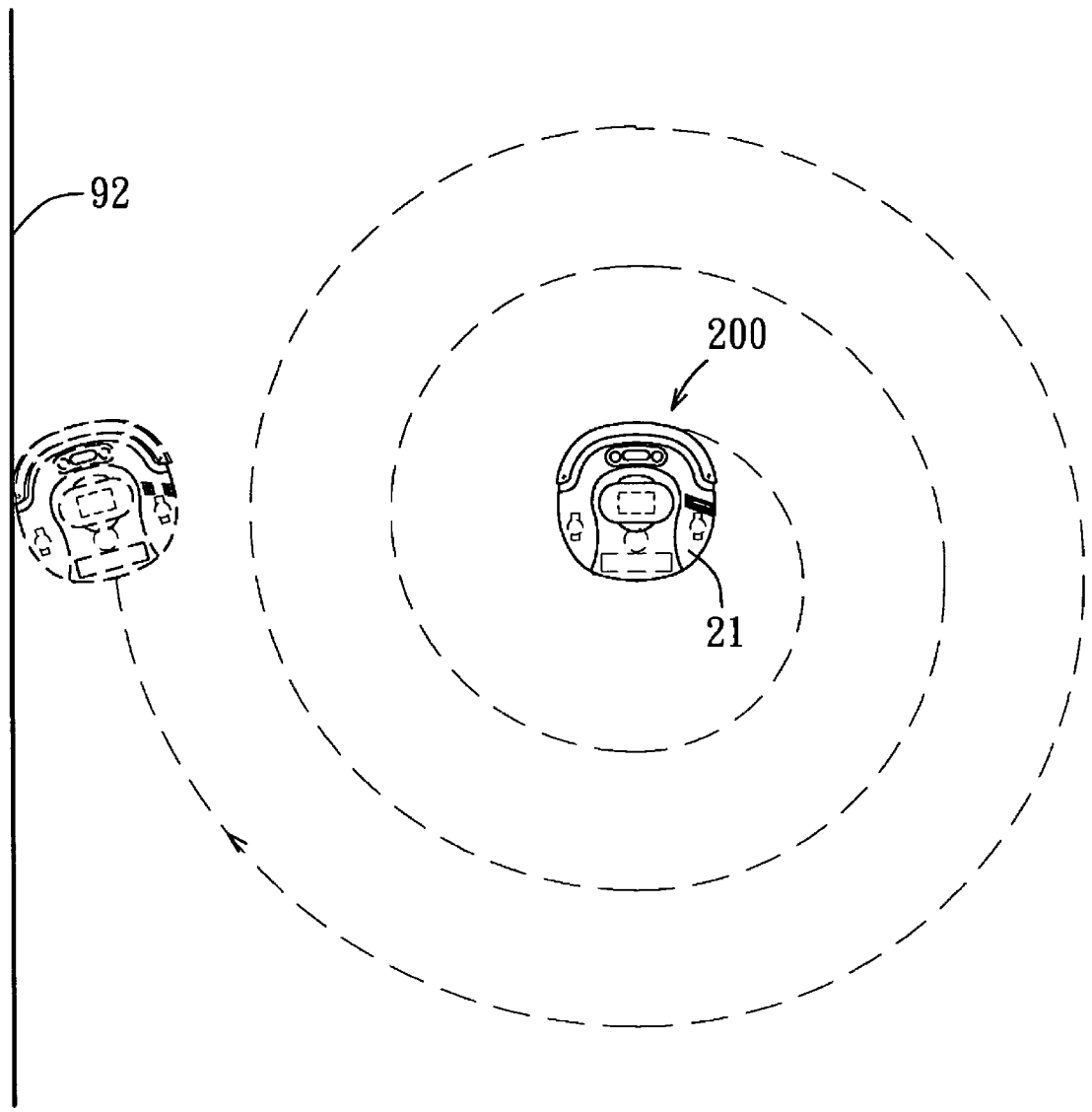
FIG. 3 is a schematic view showing the preferred embodiment of the robotic vacuum cleaner in a starting mode along a circular spiral path.
Figure 4:
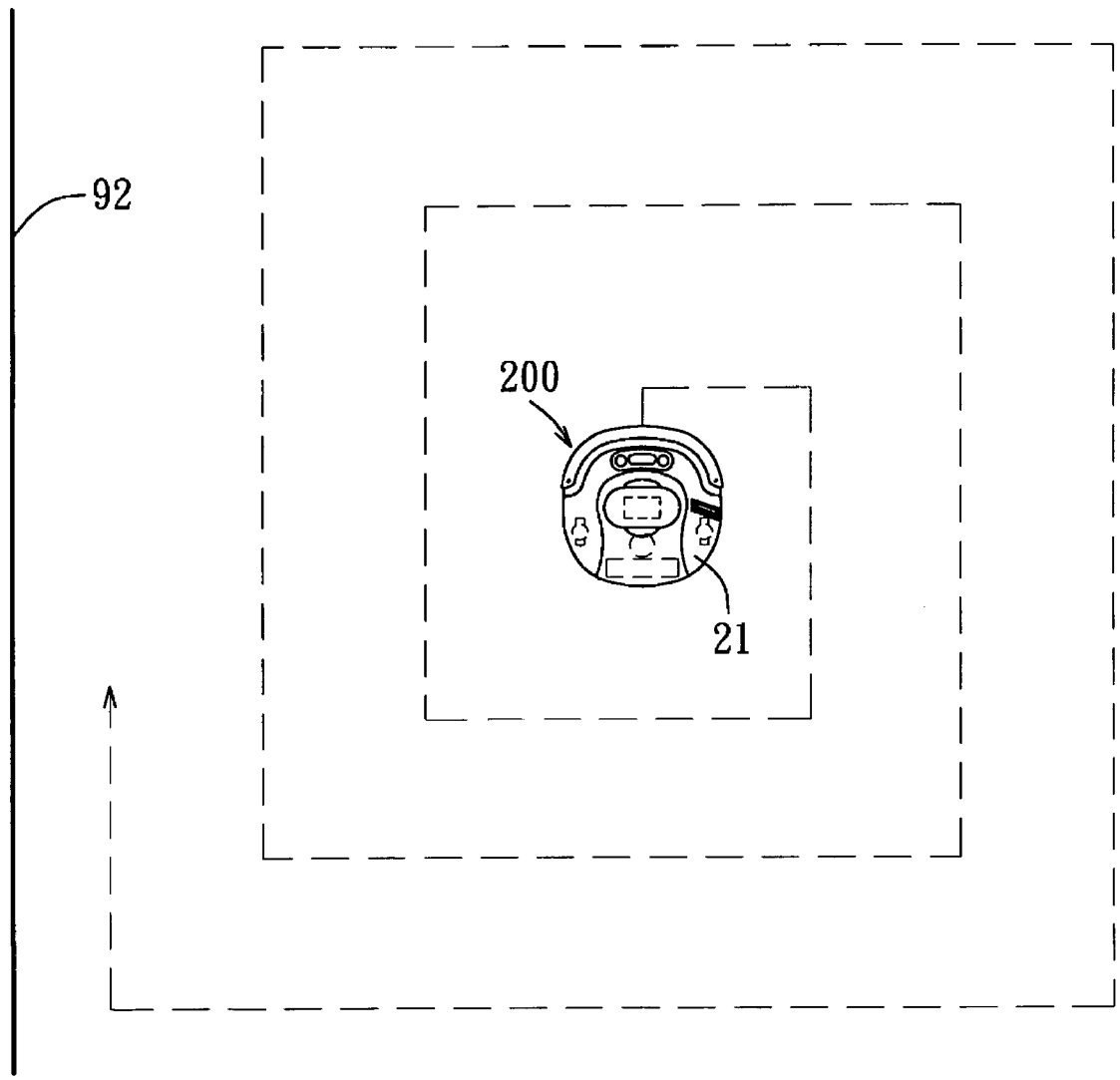
FIG. 4 is a schematic view showing the preferred embodiment of the robotic vacuum cleaner in the starting mode, but along a rectangular spiral path.

The electrical control unit 22 includes a memory for storing a variety of path programs, is coupled to the left and right sensors 252 for receiving the switching signals, and is electrically connected to and controls the motor-driven wheel unit and the drive motor unit for controlling the motor-driven wheel unit to move along the floor surface. In operation, the electrical control unit 22 controls the motor-driven wheel unit to operate in a starting mode in which the casing 21 is moved over the floor surface, with the leading region heading forwards, along a spiral path, such as a circular spiral path constituted by a plurality of consecutive winding segments (as shown in FIG. 3), and a rectangular spiral path constituted by a plurality of consecutive straight segments with each two adjacent straight segments being perpendicular to each other (as shown in FIG. 4).

Figure 5:
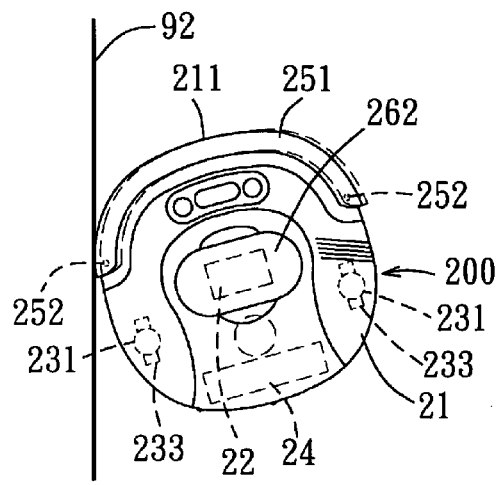
FIGS. 5 to 9 are schematic views showing the preferred embodiment of the robotic vacuum cleaner in an edge-cleaning mode.
Figure 6:
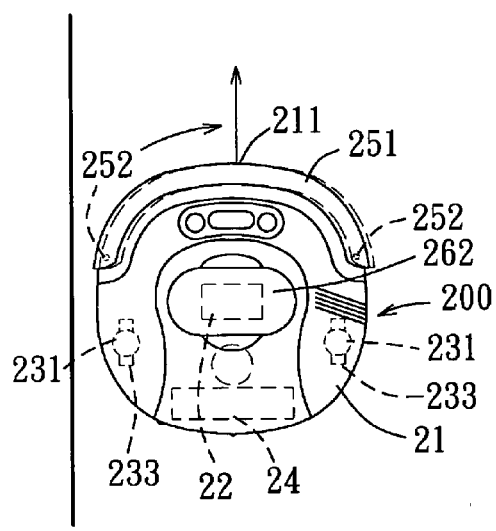
Figure 7:
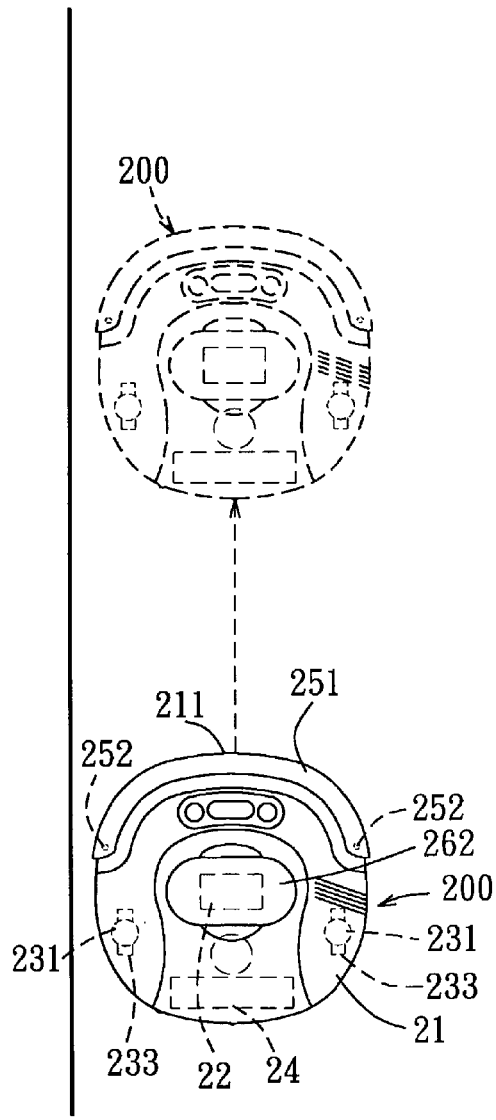
Figures 8, 9:
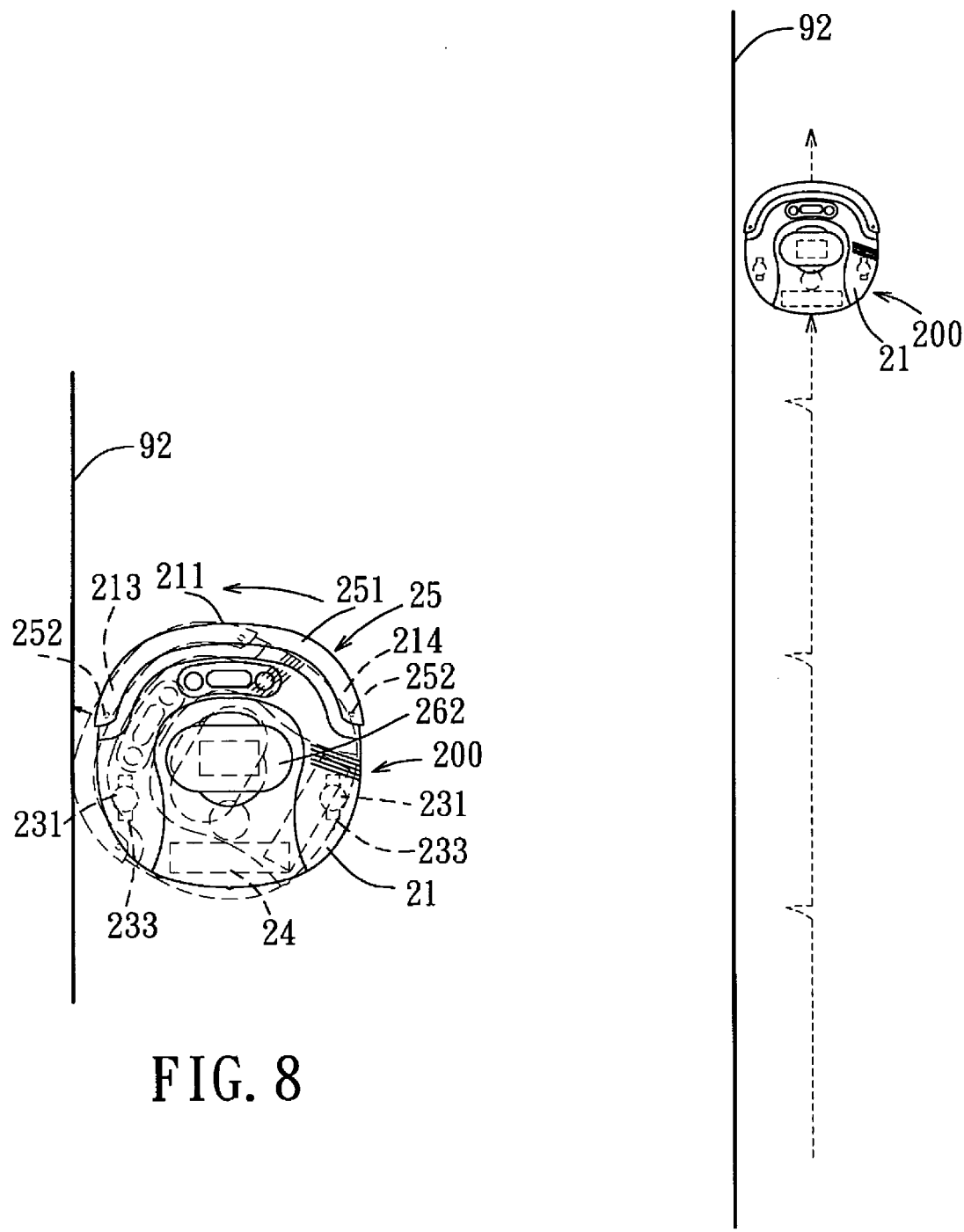

Referring to FIG. 5, once the shielding plate 251 is brought to contact the obstacle 92, one of the sensors 252 is activated to generate a switching signal, which is sent to the electrical control unit 22. Upon receipt of the switching signal, the electrical control unit 22 controls the motor-driven wheel unit to operate in an edge-cleaning mode. That is, the motor-driven wheel unit initially turns the casing 21 away from the obstacle 92 until there is not received the switching signal from the tactile sensor unit, as shown in FIG. 6, and moves forward a predetermined distance along the floor surface, as shown in FIG. 7. Thereafter, the motor-driven wheel unit turns to an activating angle such that the casing 21 moves forward to contact with the obstacle 92 until receipt of another switching signal from the tactile sensor unit 25, thereby enabling the motor-driven wheel unit to continue to operate in the edge-cleaning mode. Thus, the casing 21 can be controlled to move along the floor surface substantially along the edge of the obstacle 92 to achieve a better cleaning effect, as shown in FIG. 9.

When the motor-driven wheel unit is steered to one of the normal angle and the activating angle in the edge-cleaning mode, the left and right wheels 233 are moved in opposite directions so as to turn the casing 21 away from or toward the obstacle 92. Alternatively, the left and right wheels 233 are moved in the same direction and at different speeds to permit turning of the casing 21 away from or toward the obstacle 92.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A robotic vacuum cleaner comprising:

A casing having a lower major wall which is adapted to confront a floor surface to be cleaned, and which includes a central area that defines a central axis normal to said central major wall, and a surrounding peripheral area that surrounds said central area about the central axis, said surrounding peripheral area including a leading region which is positioned ahead of said central area when said casing is driven to move along the floor surface, and a left front region and a right front region which flank said leading region;

a suction unit which is disposed in said lower major wall, and which is adapted to draw dust from the floor surface to be cleaned;

a motor-driven wheel unit which is disposed on said lower major wall and behind said leading region;

a drive motor unit disposed to drive said motor-driven wheel unit to move said casing along the floor surface;

a tactile sensor unit including a shielding plate, a left sensor, and a right sensor, wherein the shielding plate, which when receives an applied force it is able to shift toward said casing in the side where the shielding plate receives the applied force and shifts back to its original position when not receives the applied force, is mounted to said casing and outwardly covers said leading region, the left front region, and the right front region, and wherein the shielding plate shifts toward the left front region or the right front region of said casing to depress the left sensor or the right sensor according to which front region of said casing is a depressed side, and wherein after the left sensor or right sensor is thus depressed by the shielding plate, said tactile sensor unit generates a switching signal until releasing the shielding plate from depressing the sensor by allowing the shielding plate to shift outward from the depressed side; and an electrical control unit coupled to said tactile sensor unit and said drive motor unit, said electrical control unit being operable to control said motor-driven wheel unit to operate in a starting mode in which said casing is moved along a spiral path, with said leading region heading forwards, wherein upon receipt of said switching signal from said tactile sensor unit, said electrical control unit is configured to cause operation of said motor-driven wheel unit an edge-cleaning mode, in which said motor-driven wheel unit is initially controlled by the electrical control unit to turn said casing away from a detectable obstacle until there is not received said switching signal from said tactile sensor unit, is then controlled by the electrical control unit to move said casing forward a predetermined distance along the floor surface, and is subsequently controlled by the electrical control unit to turn an activating angle such that said casing moves forward to contact with said detectable obstacle, until there is not received said switching signal from said tactile sensor unit and repeats the same.

2. The robotic vacuum cleaner of claim 1, wherein said surrounding peripheral area further includes left and right rear regions disposed rearwardly of said left and right front regions, respectively, said motor-driven wheel unit including left and right wheels which are mounted on said left and right rear regions, respectively, said drive motor unit including left and right drive motors which are disposed to drive said left and right wheels, respectively.

3. The robotic vacuum cleaner of claim 2, wherein said left and right wheels are disposed to be moved in opposite directions so as to steer said motor-driven wheel unit to one of the normal angle and the activating angle.

4. The robotic vacuum cleaner of claim 2, wherein said left and right wheels are disposed to be moved in the same direction and at different speeds so as to steer said motor-driven wheel unit to one of the normal angle and the activating angle.

5. The robotic vacuum cleaner of claim 2, wherein said tactile sensor unit includes a shielding plate which is mounted to said casing and which covers said leading region and said left and right front regions, and left and right sensors which are disposed between said shielding plate and said left front region, and between said shielding plate and said right front region, respectively, said shielding plate being configured to be radially movable relative to said casing such that once said shielding plate is brought to contact the obstacle, said shielding plate is moved radially toward said casing thereby to contact a corresponding one of said left and right sensors, thereby activating the corresponding one of said left and right sensors to generate the switching signal.

6. The robotic vacuum cleaner of claim 1, wherein the spiral path is constituted by a plurality of consecutive winding segments.

7. The robotic vacuum cleaner of claim 1, wherein the spiral path is constituted by a plurality of consecutive straight segments, each two adjacent ones of said consecutive straight segments being perpendicular to each other.

8. The robotic vacuum cleaner of claim 1, wherein said suction unit includes a duct which is disposed in said casing and which has a vacuum inlet extending downwardly of said lower major wall, and an impeller which is disposed in said casing and downstream of said vacuum inlet so as to draw dust from the floor surface to be cleaned.

9. An edge cleaning method in a robotic vacuum cleaner, the robotic vacuum cleaner comprising a casing having a lower major wall which is adapted to confront a floor surface to be cleaned, and which includes a central area that defines a central axis normal to said central major wall, and a surrounding peripheral area that surrounds said central area about the central axis, said surrounding peripheral area including a leading region which is positioned ahead of said central area when said casing is driven to move along the floor surface, and a left front region and a right front region which flank said leading region;

a suction unit which is disposed in said lower major wall, and which is adapted to draw dust from the floor surface to be cleaned;

a motor-driven wheel unit which is disposed on said lower major wall and behind said leading region;

a drive motor unit disposed to drive said motor-driven wheel unit to move said casing along the floor surface;

a tactile sensor unit including a shielding plate, a left sensor ,and a right sensor, wherein the shielding plate, which when receives an applied force it is able to shift toward said casing in the side where the shielding plate receives the applied force and shifts back to its original position when not receives the applied force, is mounted to said casing and outwardly covers said leading region, the left front region, and the right front region, and wherein the shielding plate shifts toward the left front region or the right front region of said casing to depress the left sensor or the right sensor according to which front region of said casing is a depressed side, and wherein after the left sensor or right sensor is thus depressed by the shielding plate, said tactile sensor unit generated a switching signal until releasing the shielding plate from depressing the sensor by allowing the shielding plate to shift outward from the depressed side; and an electrical control unit coupled to said tactile sensor unit and said drive motor unit, said electrical control unit being operable to control said motor-driven wheel unit to operate in a starting mode in which said casing is moved along a spiral path, with said leading region heading forwards, wherein upon receipt of said switching signal from said tactile sensor unit, said electrical control unit controls said motor-driven wheel unit to operate in an edge-cleaning mode;

said edge cleaning mode comprising steps of:

the electrical control unit initially controlling said motor-driven wheel unit to turn said casing away from a detectable obstacle until there is not received said switching signal from said tactile sensor unit, and then to move said casing forward a predetermined distance;

the electrical control unit then controlling said motor-driven wheel unit to turn an activating angle such that said casing moves forward to contact with said detectable obstacle until there is not received said switching signal from said tactile sensor unit; and repeating the foregoing steps during the edge cleaning mode.

10. The edge cleaning method in a robotic vacuum cleaner of claim 9, wherein said surrounding peripheral area further includes left and right rear regions disposed rearwardly of said left and right front regions, respectively, said motor-driven wheel unit including left and right wheels which are mounted on said left and right rear regions, respectively, said drive motor unit including left and right drive motors which are disposed to drive said left and right wheels, respectively.

11. The edge cleaning method in a robotic vacuum cleaner of claim 10, wherein said left and right wheels are disposed to be moved in opposite directions so as to steer said motor-driven wheel unit to one of the normal angle and the activating angle.

12. The edge cleaning method in a robotic vacuum cleaner of claim 10, wherein said left and right wheels are disposed to be moved in the same direction and at different speeds so as to steer said motor-driven wheel unit to one of the normal angle and the activating angle.

13. The edge cleaning method in a robotic vacuum cleaner of claim 10, wherein said tactile sensor unit includes a shielding plate which is mounted to said casing and which covers said leading region and said left and right front regions, and left and right sensors which are disposed between said shielding plate and said left front region, and between said shielding plate and said right front region, respectively, said shielding plate being configured to be radially movable relative to said casing such that once said shielding plate is brought to contact the obstacle, said shielding plate is moved radially toward said casing thereby to contact a corresponding one of said left and right sensors, thereby activating the corresponding one of said left and right sensors to generate the switching signal.

14. The edge cleaning method in a robotic vacuum cleaner of claim 9, wherein the spiral path is constituted by a plurality of consecutive winding segments.

15. The edge cleaning method in a robotic vacuum cleaner of claim 9, wherein the spiral path is constituted by a plurality of consecutive straight segments, each two adjacent ones of said consecutive straight segments being perpendicular to each other.

16. The edge cleaning method in a robotic vacuum cleaner of claim 9, wherein said suction unit includes a duct which is disposed in said casing and which has a vacuum inlet extending downwardly of said lower major wall, and an impeller which is disposed in said casing and downstream of said vacuum inlet so as to draw dust from the floor surface to be cleaned.

* * * * *